US012593836B2

(12) United States Patent　　　　　(10) Patent No.:　　US 12,593,836 B2

Everington　　　　　　　　　　　　　　(45) Date of Patent:　　　Apr. 7, 2026

(54) REMOTE ACTIVATED ANIMAL DECOY SYSTEM AND METHOD

(71) Applicant: Charles Philip Everington, New Bern, NC (US)

(72) Inventor: Charles Philip Everington, New Bern, NC (US)

(73) Assignee: Reeler Enterprise LLC, Dover, NC (US)

( * ) Notice: Subject to any disclaimer, the term of this patent is extended or adjusted under 35 U.S.C. 154(b) by 11 days.

(21) Appl. No.: 18/807,502

(22) Filed: Aug. 16, 2024

(65) Prior Publication Data

US 2026/0047569 A1　　Feb. 19, 2026

(51) Int. Cl.
A01M 31/06　　　　(2006.01)

(52) U.S. Cl.
CPC .................................... A01M 31/06 (2013.01)

(58) Field of Classification Search
CPC ..................................................... A01M 31/06
See application file for complete search history.

(56) References Cited

U.S. PATENT DOCUMENTS

| | | | | |
|---|---|---|---|---|
| 2,787,074 A | * | 4/1957 | Miller | A01M 31/06 D22/125 |
| 3,689,927 A | * | 9/1972 | Boston | A01M 31/06 213/3 |
| 3,916,553 A | * | 11/1975 | Lynch | A01M 31/06 43/3 |
| 3,927,485 A | * | 12/1975 | Thorsnes, Jr. | A01M 31/06 43/3 |
| 4,965,953 A | * | 10/1990 | McKinney | A01M 31/06 43/2 |
| 5,036,614 A | * | 8/1991 | Jackson | A01M 31/06 43/3 |
| 5,168,649 A | * | 12/1992 | Wright | A01M 31/06 43/2 |
| 5,233,780 A | * | 8/1993 | Overholt | A01M 31/06 43/2 |

(Continued)

FOREIGN PATENT DOCUMENTS

| | | | |
|---|---|---|---|
| CA | 2866994 A1 | * 10/2014 | |
| CN | 108935440 A | * 12/2018 | A01M 31/06 |

(Continued)

*Primary Examiner* — Christopher P Ellis

(74) *Attorney, Agent, or Firm* — Ward and Smith, P.A.; Ryan K. Simmons

(57)　　　　　　　ABSTRACT

A remote activated moveable animal decoy system. The remote activated moveable animal decoy system may include an animal decoy; a motor; a mounting rod, configured to be coupled to the motor at a first end of the mounting rod and to the animal decoy at a second end of the mounting rod, and wherein the motor is configured to impart motion to the rod, and thereby the animal decoy, upon actuation of the motor; a power source, wherein the power source is configured to provide power to the motor; a base, wherein the base is configured for supporting the remote activated moveable animal decoy system upon a ground surface, and wherein one or more of the motor, the power source, a communications interface, and/or a controller is housed within the base; and a remote activation device, wherein the remote activation device is configured to actuate the motor remotely.

20 Claims, 15 Drawing Sheets

(56) References Cited

U.S. PATENT DOCUMENTS

| | | | | |
|---|---|---|---|---|
| 5,289,654 A * | 3/1994 | Denny | A01M 31/06 | 43/2 |
| 5,459,958 A * | 10/1995 | Reinke | A01M 31/06 | 43/2 |
| 5,515,637 A * | 5/1996 | Johnson | A01M 31/06 | 43/2 |
| 6,481,147 B2 * | 11/2002 | Lindaman | A01M 31/06 | 43/2 |
| 6,708,440 B2 * | 3/2004 | Summers | A01M 31/06 | 43/2 |
| 7,958,666 B2 * | 6/2011 | Rogers | A01M 31/06 | 43/2 |
| 8,051,598 B2 * | 11/2011 | Stillwell | A01M 31/06 | 43/2 |
| 8,230,638 B1 * | 7/2012 | Dunaway | A01M 31/06 | 43/2 |
| 8,713,846 B1 * | 5/2014 | Thrash | A01M 31/06 | 43/2 |
| 8,919,028 B2 * | 12/2014 | Young | A01M 31/06 | 43/3 |
| 9,648,868 B1 * | 5/2017 | Donnay | A01M 31/06 | |
| 9,661,841 B2 | 5/2017 | Gunn | | |
| 10,292,380 B1 * | 5/2019 | DeLoach, III | H04W 4/024 | |
| 2006/0053675 A1 * | 3/2006 | Lindaman | A01M 31/06 | 43/2 |
| 2006/0143968 A1 * | 7/2006 | Brint | A01M 31/06 | 43/2 |
| 2008/0010892 A1 * | 1/2008 | Goebel | A01M 31/06 | 43/2 |
| 2008/0029659 A1 * | 2/2008 | Weber | A01M 31/06 | 248/156 |
| 2009/0235571 A1 * | 9/2009 | Wyant | A01M 31/06 | 43/2 |
| 2009/0249678 A1 * | 10/2009 | Arnold | A01M 31/06 | 43/2 |
| 2010/0064569 A1 * | 3/2010 | Wyant | A01M 31/06 | 43/2 |
| 2010/0186280 A1 * | 7/2010 | Dunkin | A01M 31/06 | 43/2 |
| 2011/0232154 A1 * | 9/2011 | Crank, Jr. | A01M 31/06 | 43/3 |
| 2012/0240447 A1 * | 9/2012 | Gurner, III | F16M 11/18 | 248/176.1 |
| 2013/0247441 A1 * | 9/2013 | Bellamy | A01M 31/06 | 43/2 |
| 2015/0208641 A1 * | 7/2015 | Gurner, III | F16M 11/28 | 248/522 |
| 2017/0114951 A1 * | 4/2017 | Lane | A01M 31/06 | |
| 2017/0142960 A1 * | 5/2017 | Patterson | H04N 23/57 | |
| 2017/0238529 A1 * | 8/2017 | Norwood | A01M 31/06 | |
| 2017/0238530 A1 * | 8/2017 | Cagle | A01M 31/06 | |
| 2017/0339942 A1 * | 11/2017 | Van Grinsven | A01M 31/06 | |
| 2018/0035660 A1 * | 2/2018 | Zahourek | A01M 31/06 | |
| 2018/0064098 A1 * | 3/2018 | Davis | A01M 31/06 | |
| 2019/0037830 A1 * | 2/2019 | Cagle | A01M 31/06 | |
| 2019/0250602 A1 * | 8/2019 | DeLoach, III | H02J 7/0042 | |
| 2019/0335744 A1 * | 11/2019 | Rodriguez | F16M 11/12 | |
| 2020/0113174 A1 * | 4/2020 | Denmon | A01M 31/06 | |
| 2020/0120921 A1 * | 4/2020 | Harris | B29C 51/10 | |
| 2020/0367486 A1 * | 11/2020 | Butz | A01M 31/06 | |
| 2021/0037808 A1 * | 2/2021 | Noe | A01M 31/06 | |
| 2021/0259238 A1 * | 8/2021 | White | A01M 31/06 | |
| 2024/0237633 A1 * | 7/2024 | Denmon | A01M 31/06 | |

FOREIGN PATENT DOCUMENTS

| | | | | |
|---|---|---|---|---|
| CN | 111493061 A * | 8/2020 | | A01M 31/06 |
| GB | 2518253 A * | 3/2015 | | A01M 31/06 |

* cited by examiner

200

210

110

210

114

254    252

250

210

210

(TOP)

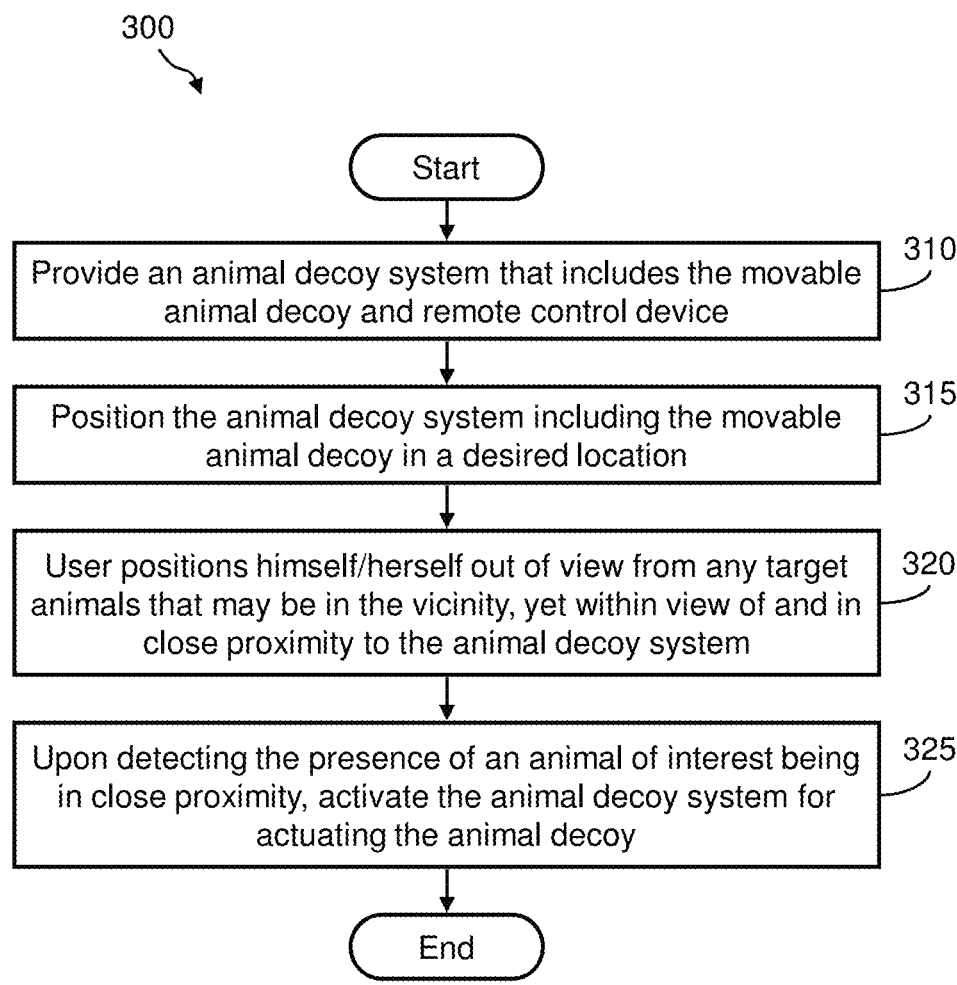

300

Start

Provide an animal decoy system that includes the movable animal decoy and remote control device    310

Position the animal decoy system including the movable animal decoy in a desired location    315

User positions himself/herself out of view from any target animals that may be in the vicinity, yet within view of and in close proximity to the animal decoy system    320

Upon detecting the presence of an animal of interest being in close proximity, activate the animal decoy system for actuating the animal decoy    325

End

*FIG. 6*

REMOTE ACTIVATED ANIMAL DECOY SYSTEM AND METHOD

TECHNICAL FIELD

The subject matter relates generally to animal decoys and more particularly to a remote activated animal decoy (or attracting) system and method.

BACKGROUND

It is common to utilize decoys as a hunting aid when hunting certain types of animals, such as deer, bear, and turkeys. However, the effectiveness of decoys is often limited due to limitations in emulating appearance and natural movements of wild animals. For example, deer communicate by using certain body movement, such as movement of the tail in a back-and-forth motion or flipping of the tail up and down (flagging). Most animal decoys have no, or very limited, ability to move and emulate an animal's natural body movement. Therefore, such decoys do not always provide a realistic appearance since they are not capable of suitably emulating an animal's natural body movement and are often fixed in one position. Consequently, such decoys cannot mimic certain communications between the animals that would be advantageous in attracting an animal into closer range. Therefore, new approaches are needed for providing decoys that have a realistic lifelike appearance and that mimic an animal's natural body movements.

SUMMARY

In one embodiment a remote activated moveable animal decoy system is provided. The remote activated moveable animal decoy system may include an animal decoy; a motor; a mounting rod, wherein the mounting rod is configured to be coupled to the motor at a first end of the mounting rod and to the animal decoy at a second end of the mounting rod, and wherein the motor is configured to impart motion to the rod, and thereby the animal decoy, upon actuation of the motor; a power source, wherein the power source is configured to provide power to the motor; a base, wherein the base is configured for supporting the remote activated moveable animal decoy system upon a ground surface, and wherein one or more of the motor, the power source, a communications interface, and/or a controller is housed within the base; and a remote activation device, wherein the remote activation device is configured to actuate the motor remotely. The motor may include a servo motor. The power source may include a battery pack. The base may include one or more anchor mechanisms for anchoring the system to a ground surface. The animal decoy may include a turkey decoy. The animal decoy may be removable from the connecting rod. The motor may be configure to move the connecting rod between a first position and a second position, wherein in the first position the connecting rod is generally vertical and substantially perpendicular to a ground surface and in the second position the connecting rod is at an angle less than 90 degrees relative to the ground surface. The motor may be configure to move the connecting rod from a first position to a second position and then back and forth between the second position and a third position, wherein in the first position the connecting rod is generally vertical and substantially perpendicular to a ground surface, in the second position the connecting rod is at an angle less than 90 degrees relative to the ground surface, and in the third position the connecting rod is at an angle relative to the ground surface between that of the first position of the connecting rod and that of the second position of the connecting rod. The animal decoy may include a slit formed in its underside, wherein the connecting rod passes therethrough when installed thereon, and wherein the slit is configured to allow the animal decoy to rock forward and backward the width of the slit, as well as up and down, as the connecting rod is moved back and forth between the second position and third position. The up and down and backward and forward movement of the animal decoy mimics an animal's head bobbing up and down during feeding.

In another embodiment a method of using a remote activated moveable animal decoy system is provided. The method may include providing a remote activated moveable animal decoy system. The remote activated moveable animal decoy system may include an animal decoy; a motor; a mounting rod, wherein the mounting rod is configured to be coupled to the motor at a first end of the mounting rod and to the animal decoy at a second end of the mounting rod, and wherein the motor is configured to impart motion to the rod, and thereby the animal decoy, upon actuation of the motor; a power source, wherein the power source is configured to provide power to the motor; a base, wherein the base is configured for supporting the remote activated moveable animal decoy system upon a ground surface, and wherein one or more of the motor, the power source, a communications interface, and/or a controller is housed within the base; and a remote activation device, wherein the remote activation device is configured to actuate the motor remotely. The method may further include positioning the animal attracting system in a desired location; and actuating the animal attracting system via the remote activation device.

BRIEF DESCRIPTION OF THE DRAWINGS

Figure 1:
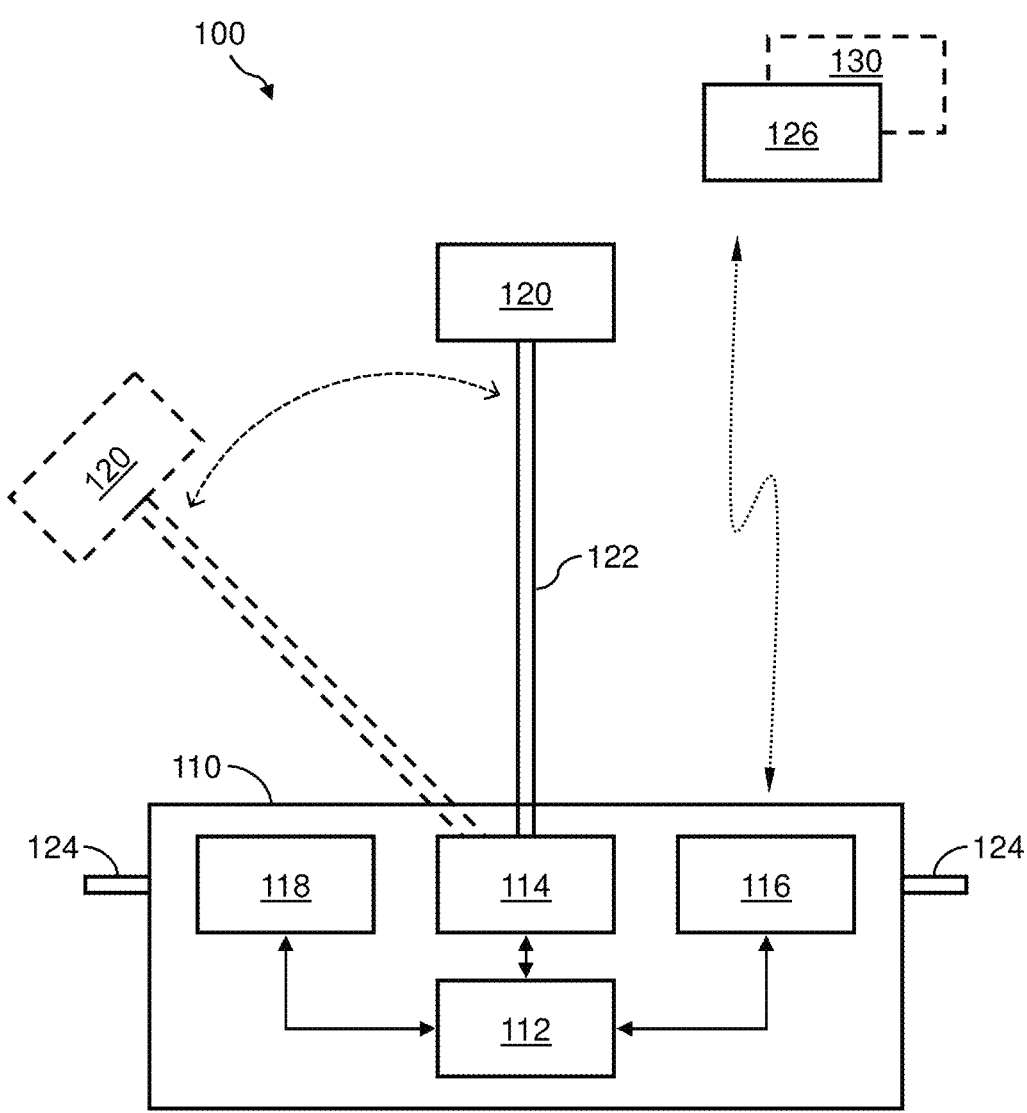
Figure 2:
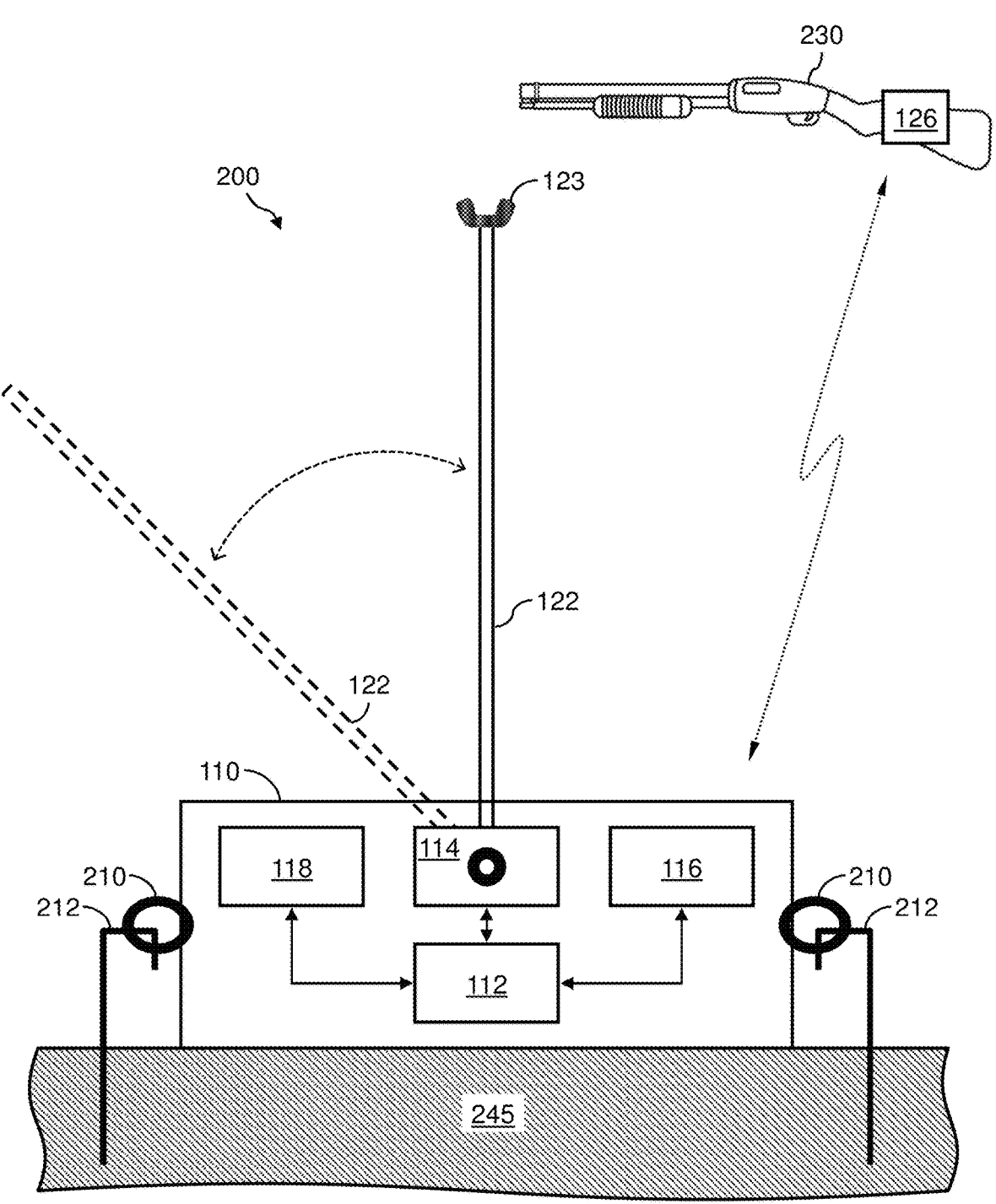
Figure 3:
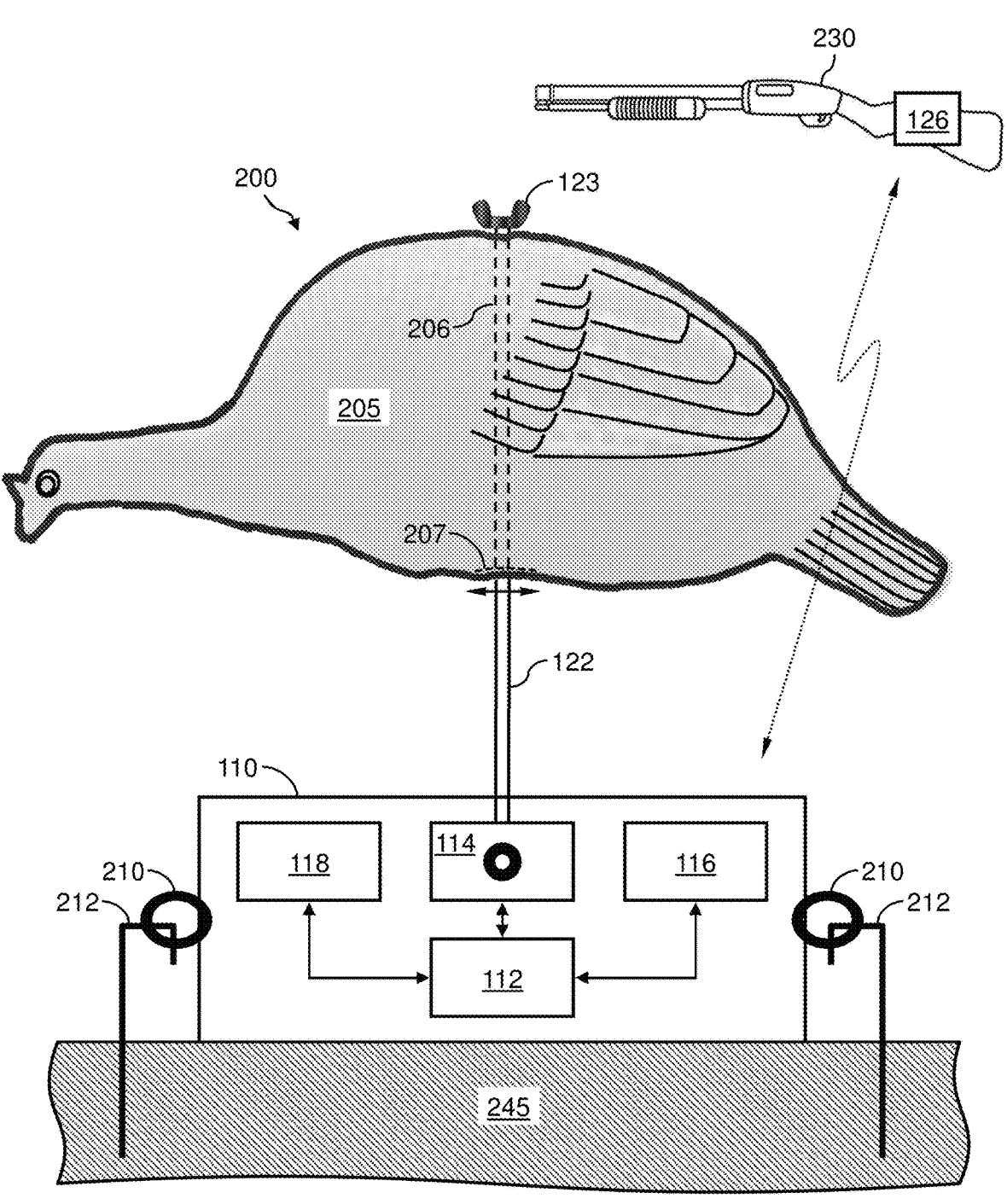
Figure 4:
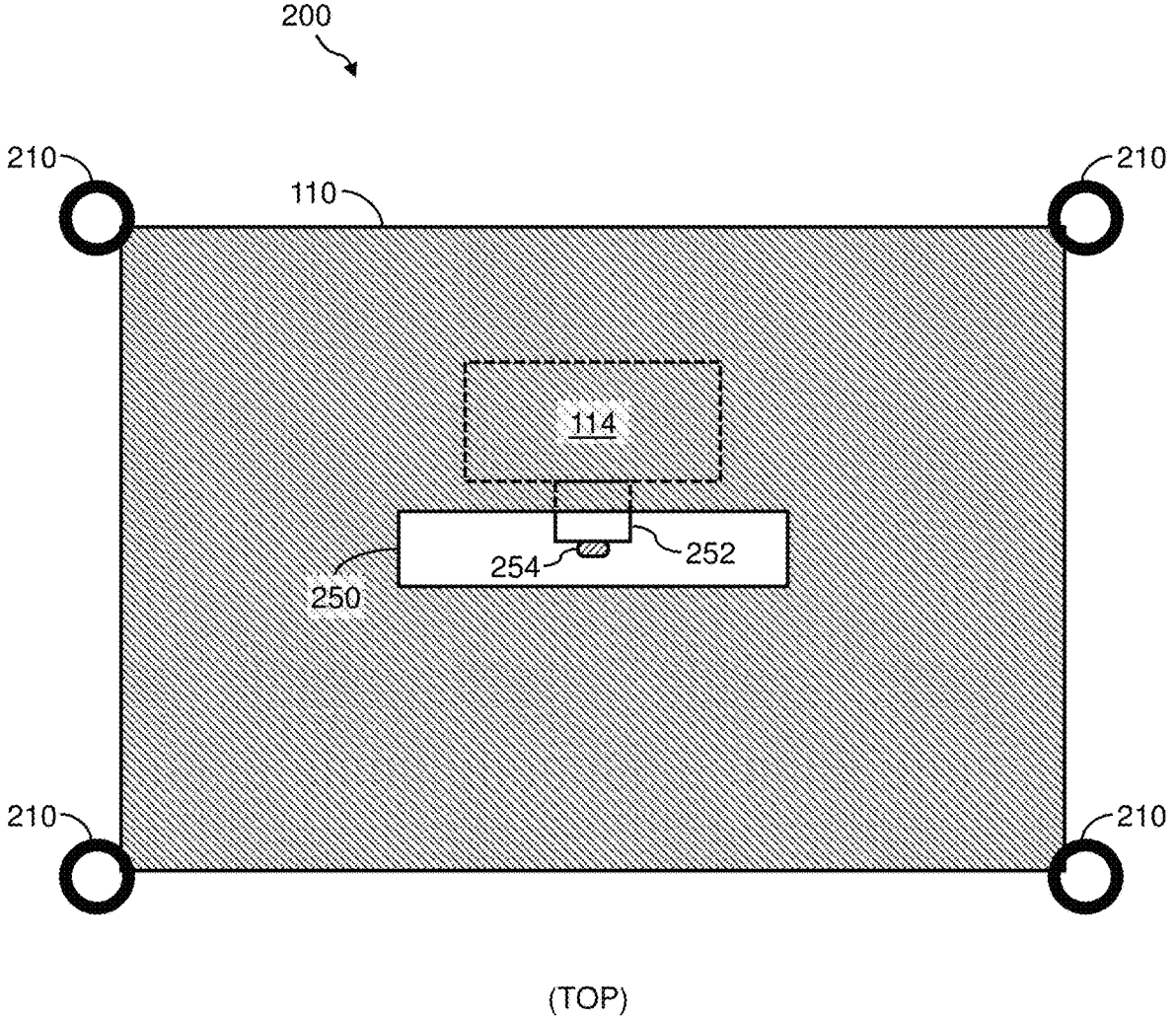
Figure 7:
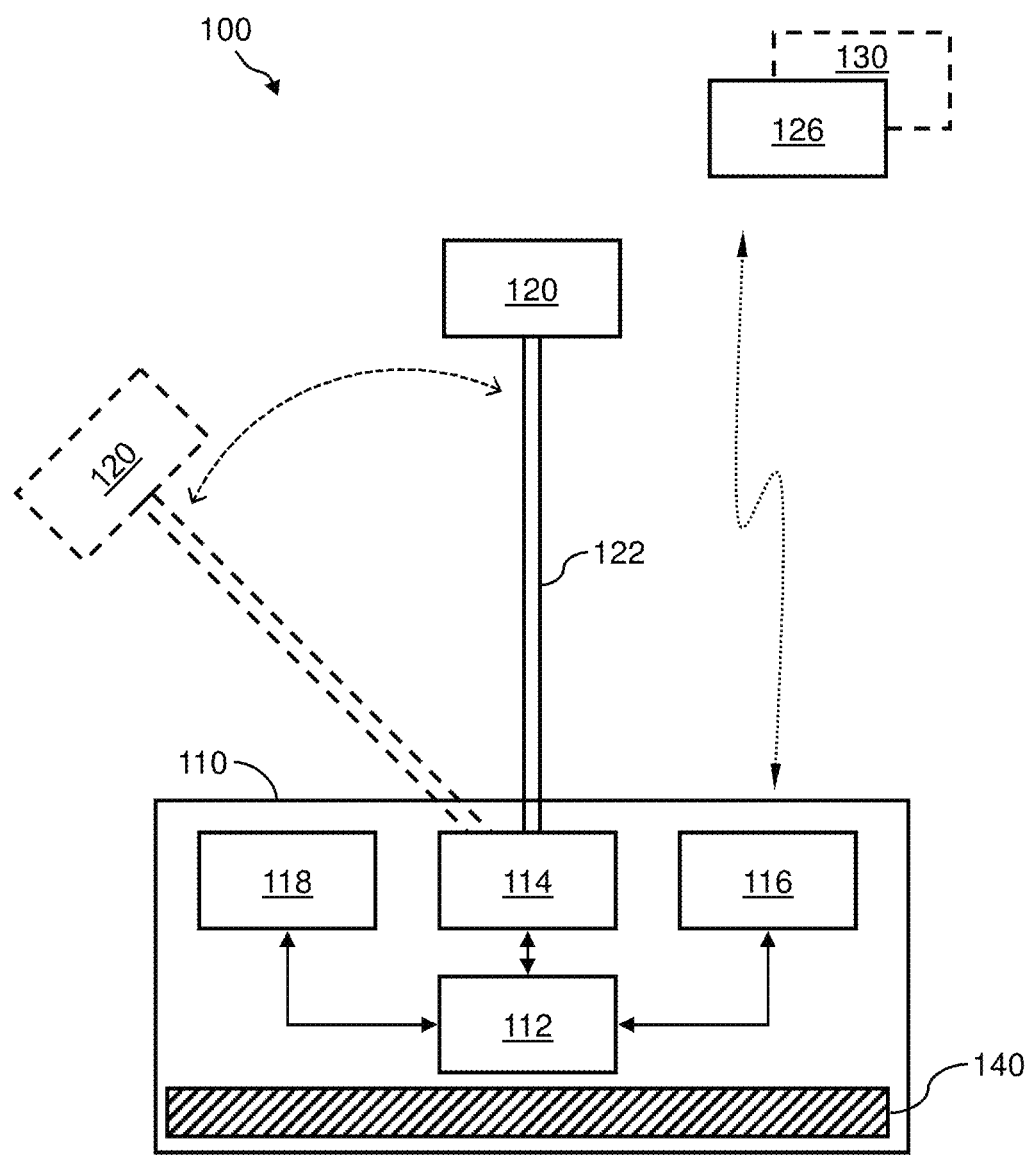
Figure 8:
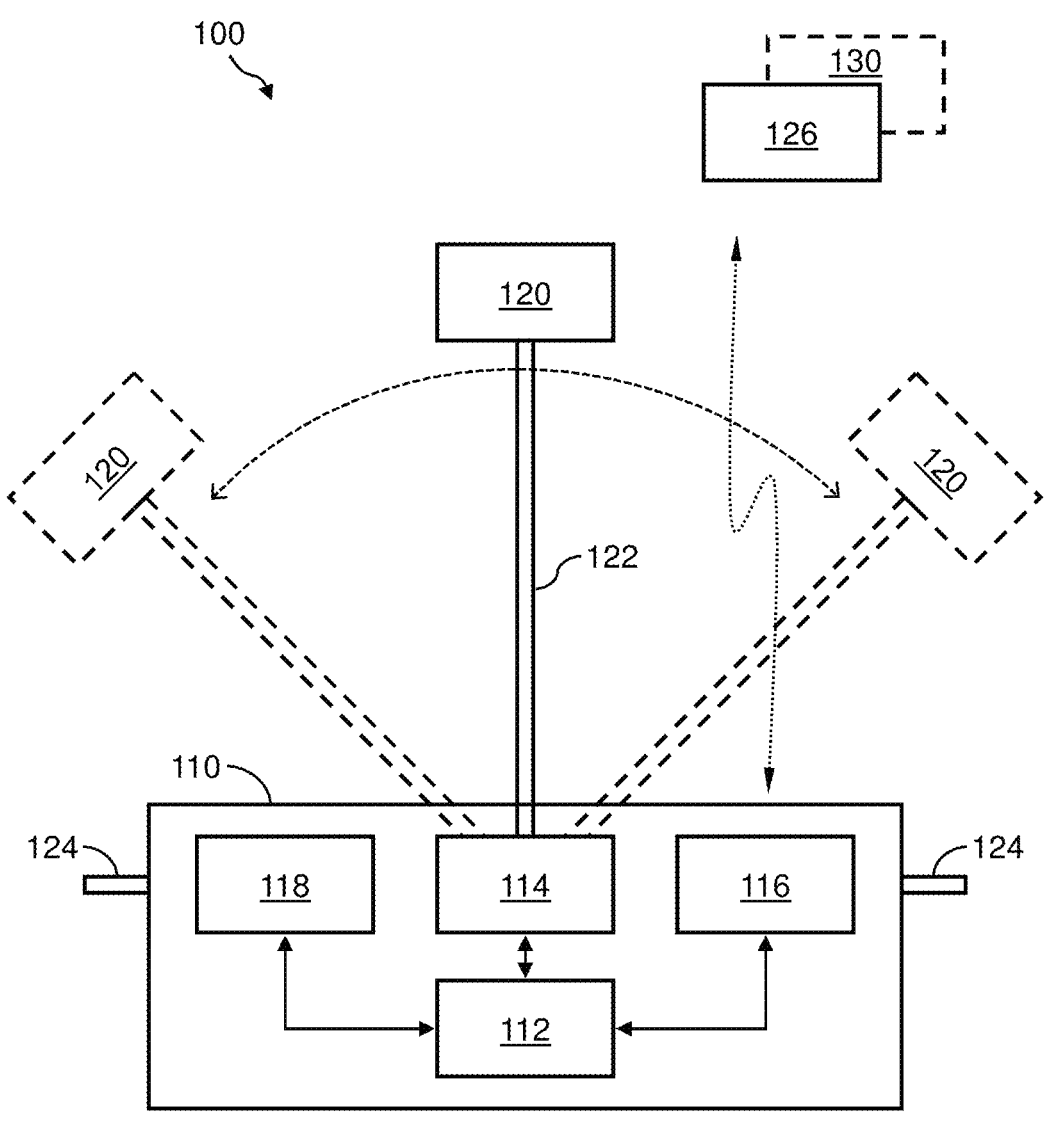
Figure 9:
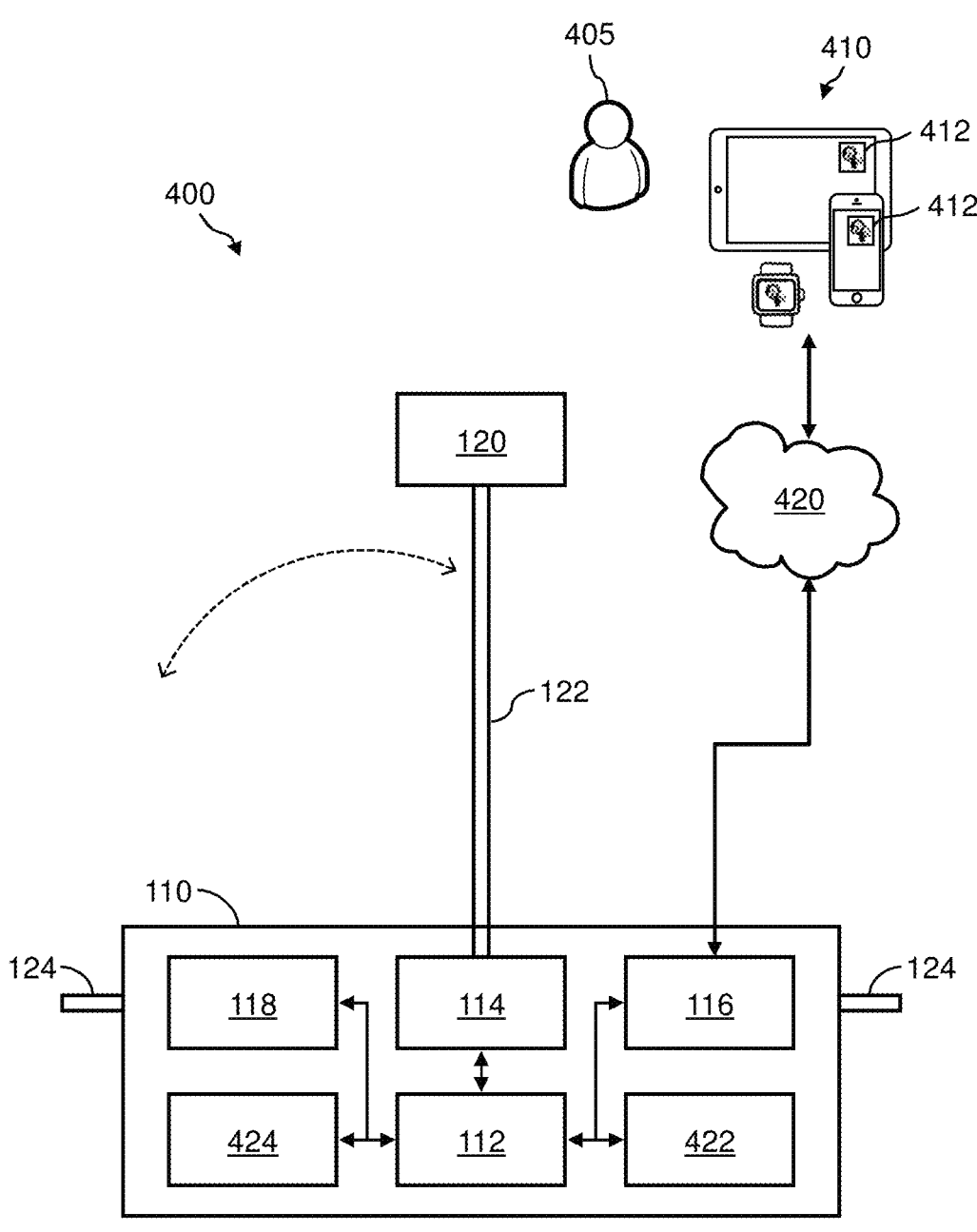

Having thus described the subject matter in general terms, reference will now be made to the accompanying drawings, which are not necessarily drawn to scale, and wherein:

FIG. 1 illustrates a block diagram of an example of an animal decoy (or attracting) system, in accordance with an embodiment of the disclosure;

FIG. 2 illustrates a side view of another animal decoy system, which is one example implementation of the animal decoy (or attracting) system shown in FIG. 1, in accordance with an embodiment of the disclosure;

FIG. 3 illustrates a side view of the animal decoy system shown in FIG. 2 using a turkey decoy, in accordance with an embodiment of the disclosure;

FIG. 4 illustrates a top view of the animal decoy system shown in FIG. 2, in accordance with an embodiment of the disclosure;

FIG. 5A through FIG. 5G illustrate side views showing an example of the animal decoy system shown in FIG. 3 in operation using the turkey decoy, in accordance with an embodiment of the disclosure;

FIG. 6 illustrates a flow diagram of an example of a method of using the animal decoy (or attracting) system, in accordance with an embodiment of the disclosure;

FIG. 7 illustrates a block diagram of an example of an animal decoy (or attracting) system including a weighted enclosure rather than an anchored enclosure, in accordance with another embodiment of the disclosure, FIG. 8 illustrates a block diagram of an example of an animal decoy (or attracting) system and showing an example of another range of motion, in accordance with yet another embodiment of the disclosure, and FIG. 9 illustrates a block diagram of an example of an animal decoy (or attracting) system including a mobile app, in accordance with still another embodiment of the disclosure.

DETAILED DESCRIPTION

The subject matter now will be described more fully hereinafter with reference to the accompanying drawings, in which some, but not all embodiments of the subject matter are shown. Like numbers refer to like elements throughout. The subject matter may be embodied in many different forms and should not be construed as limited to the embodiments set forth herein; rather, these embodiments are provided so that this disclosure will satisfy applicable legal requirements. Indeed, many modifications and other embodiments of the subject matter set forth herein will come to mind to one skilled in the art to which the subject matter pertains having the benefit of the teachings presented in the foregoing descriptions and the associated drawings. Therefore, it is to be understood that the subject matter is not to be limited to the specific embodiments disclosed and that modifications and other embodiments are intended to be included within the scope of the appended claims.

In some embodiments, the subject matter provides a remote activated animal decoy system and method.

In some embodiments, the remote activated animal decoy system and method may provide an animal decoy that is movable in a manner that emulates an animal's natural movement and thereby provide an animal attracting or attraction system.

In some embodiments, the remote activated animal decoy system and method may provide an animal decoy that is moveable on a mounting rod and a remote control activation device.

In some embodiments, the remote activated animal decoy system and method may provide an animal decoy system capable of mounting on the ground.

In some embodiments, the remote activated animal decoy system and method may provide an animal decoy, such as a turkey decoy, that is movable in a manner that replicates or mimics a turkey feeding and thereby provide a system for attracting turkeys.

In some embodiments, the remote activated animal decoy system and method may provide a moveable animal decoy that may include a motor, such as a servo motor, for moving the animal decoy in a motion from about a vertical with respect to the ground and wherein the motor is preferably remote actuated in either wired or wireless fashion.

In some embodiments, the remote activated animal decoy system and method may provide a moveable animal decoy that may include a motor for moving the animal decoy from about vertical with respect to the ground to, for example, to some degree less than 90 degrees with respect to the ground.

In some embodiments, the remote activated animal decoy system and method may include a moveable turkey decoy and thereby providing a remote activated turkey decoy system and method.

In some embodiments, the remote activated animal decoy system and method may provide a moveable turkey decoy that may include a motor for moving the turkey decoy from about vertical with respect to the ground to, for example, about 45 degrees or more in the direction of the turkey decoy's head.

In some embodiments, the remote activated animal decoy system and method may provide a moveable animal decoy system that is controllable in wireless fashion using a mobile app running on a mobile device, such as a mobile phone (or smart phone), a tablet device, a smartwatch, and the like.

In some embodiments, the remote activated animal decoy system and method may provide an animal decoy system that may be used to attract various types of animals, both large and small, for example, but not limited to turkey, bear, deer, moose, elk, rabbit, squirrel, or any other animal.

In some embodiments, the remote activated animal decoy system and method may provide an animal decoy system that is usable in multiple applications, such as, but not limited to, hunting applications, animal control applications, animal study applications, and/or the like.

The animal decoy (or attracting) system and method will be described in more detail below with reference to FIG. 1 through FIG. 9.

Referring now to FIG. 1 is a block diagram of an example of an animal decoy (or attracting) system 100, in accordance with an embodiment of the disclosure.

The animal decoy system 100 may be an animal attracting or attraction system that may be used with multiple types of animal or wildlife decoys, such as, but not limited to turkey, bear, deer, moose, elk, rabbit, squirrel, or any other animal.

In this example, the animal decoy system 100 may include a base enclosure 110 that may house, for example, a controller 112, a motor 114, a communications interface 116, and/or a power source 118. The base enclosure 110 may be any lightweight and durable enclosure, such as a plastic or metal (e.g., aluminum) enclosure.

The controller 112 may, for example, be a general-purpose or special-purpose controller or microprocessor, or other programmable data processing apparatus. Controller 112 may provide processing capabilities, such as storing, interpreting, and/or executing software instructions. Additionally, the controller 112 may be used to control the overall operations of the animal decoy system 100. The software instructions may comprise machine-readable code stored in non-transitory memory that is accessible by the controller 112 for the execution of the instructions. The controller 112 may be configured and programmed to control data and/or power aspects of animal decoy system 100. Further, data storage (not shown) may be built into or provided separate from controller 112.

The motor 114 may drive the motion of an animal decoy 120. In one example, the motor 114 may be a servo motor. Further, the animal decoy system 100 is not limited to one motor 114 only. The animal decoy system 100 may include one or more motors 114 depending on the requirements thereof.

The communications interface 116 may be any wired and/or wireless communication interface for connecting to a network or any other devices and by which information may be exchanged. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, ISM, Bluetooth® technology, Bluetooth® Low Energy (BLE) technology, Wi-Fi, Wi-Max, IEEE 402.11 technology, ZigBee technology, Z-Wave technology, 6LoWPAN technology (i.e., IPv6 over Low Power Wireless Area Network (6LoWPAN)), ANT or ANT+ (Advanced Network Tools) technology, radio frequency (RF), Infrared Data Association (IrDA) compatible protocols, Local Area Networks (LAN), Wide Area Networks (WAN), Shared Wireless Access Protocol (SWAP), cellular network, mobile hotspot network, any combinations thereof, and other types of wireless networking protocols.

Power source 118 may be any type of power source that can be used to power any electronic devices within animal decoy system 100. For example, the power source 118 may be a battery pack including one or more rechargeable or non-rechargeable batteries for supplying power to controller 112, motor 114, and/or communications interface 116. The animal decoy 120 may be designed to mimic the look of any types of animal, both large and small, for example, but not limited to turkey, bear, deer, moose, elk, rabbit, squirrel, or any other animal. By way of example, FIG. 3 through FIG. 5G show an example of animal decoy 120 in the form of a turkey decoy.

The animal decoy 120 may be mechanically coupled to the motor 114 via, for example, a mounting rod 122. The mounting rod 122 may be a rod or bar formed, for example, of plastic, metal (e.g., aluminum), fiberglass, wood, or any other suitable material for supporting the weight of a moving animal decoy 120. Further, the base enclosure 110 may include one or more anchor mechanisms 124 for anchoring it to the ground or other mounting surface. The base enclosure 110 may be any size suitable to house the components of the animal decoy system 100 and suitable to physically and reliably support the operation of any animal decoy 120.

The animal decoy system 100 may also include a remote control device 126. The remote control device 126 may be any type of remote control device for connecting with communications interface 116 using any wired or wireless means. In one example, remote control device 126 may be used to activate remotely the motor 114 of the animal decoy system 100. In a hunting application, the remote control device 126 may be handheld by a user (e.g., the hunter), or optionally mounted on a firearm 130, or other surface.

In one example, in the ON state, the animal decoy 120 may be controlled to sweep from substantially vertical to some degree less than vertical (e.g., about 45 degrees or more downward) in one direction. That is, to repeatedly sweep back-and-forth between substantially vertical to some degree less than vertical. Returning to a stationary vertical position when turned OFF. An example of this action is shown and described below with reference to FIG. 5A through FIG. 5G. Accordingly, the remote control device 126 may include one or multiple push buttons to activate and/or deactivate the motor 114 and select the sweeping motion. More details of examples of animal decoy system 100 are shown and described below with reference to FIG. 2 through FIG. 11.

Referring now to FIG. 2 is a side view of an animal decoy system 200, which is one example implementation of the animal decoy (or attracting) system 100 shown in FIG. 1, in accordance with an embodiment of the disclosure.

The animal decoy system 200 may be substantially the same as animal decoy system 100 shown in FIG. 1 except that it shows a specific example of anchor mechanisms 124 and is absent the animal decoy. That is, in this example, the base enclosure 110 may include one or more anchor rings 240 with corresponding metal stakes 242 for anchoring it to the ground. The anchor rings 240 and metal stakes 242 are an example of the anchor mechanisms 124 described in animal decoy system 100 shown in FIG. 1. Here, the animal decoy system 200 is shown resting on the ground 245.

Additionally, FIG. 2 shows a fastener 123 at the upper end of the mounting rod 122. The animal decoy system 200 is designed such that the fastener 123 can be removed, then the animal decoy installed on the mounting rod 122, then the fastener 123 reinstalled to hold the animal decoy. For example, FIG. 3 is a side view of the animal decoy system 200 using a turkey decoy 205 and a fastener 123 in the form of a wingnut. The motor 114 may drive the motion of the turkey decoy 205, as shown below in FIG. 5A through FIG. 5G.

In FIG. 3, the turkey decoy 205 is an example of animal decoy 120 of animal decoy system 100. In this example, the turkey decoy 205 may be a turkey decoy that provides a lifelike decoy that mimics a turkey in shape, size, color, and detail. In one example, the turkey decoy 205 may be formed using lightweight durable material, such as plastic, foam, wood, fiberglass, and/or other suitable material. Further, the turkey decoy 205 is designed to be fitted on an upper portion of the mounting rod 122. For example, the turkey decoy 205 may include a clearance channel 206 through which the mounting rod 122 may pass.

Additionally, a slot 207 may be provided at the underside of the turkey decoy 205. The slot 207 may be oriented front-to-back (i.e., beak-to-tail) of the turkey decoy 205.

The slot 207 allows the turkey decoy 205 to rock slightly about the mounting rod 122 when in operation (see FIG. 5A through FIG. 5G). Further, the top of the turkey decoy 205 may be fitted with respect to the fastener 123, such that it allows the slight rocking motion of the turkey decoy 205 with respect to the mounting rod 122. The turkey decoy 205 may be a 3D or a 2D (i.e., a substantially flat) rendering of a turkey.

When using the turkey decoy 205 the animal decoy system 200 may be considered a turkey decoy system. Further, and referring still to FIG. 2 and FIG. 3, remote control device 126 is shown mounted on a shotgun 230. The shotgun 230 is an example of the firearm 130 of animal decoy system 100 shown in FIG. 1. Again, the remote control device 126 may be a simple toggle pushbutton to activate and deactivate the motor 114.

The animal decoy system 200 is not limited to using the turkey decoy 205 and being a turkey decoy system only. The animal decoy system 200 may be any animal attracting or attraction system for any types of animals, such as, but not limited to turkey, bear, deer, moose, elk, rabbit, squirrel, or any other animal.

Referring now to FIG. 4 is a top view of the animal decoy system 200 shown in FIG. 2, in accordance with an embodiment of the disclosure. However, in this view the animal decoy system 200 is shown absent the mounting rod 122 with the turkey decoy 205. The top plate portion of the base enclosure 110 includes an open slot 250 to gain access to the motor 114. More specifically, the shaft portion of the motor 114 has a mounting rod receptacle 252 for receiving and holding the lower end of the mounting rod 122. A bolt or screw or nut 254 may be provided for tightening the mounting rod receptacle 252 to the mounting rod 122. The open slot 250 is suitably wide to allow the clearance for the mounting rod 122 and its movement. The open slot 250 is suitably long to allow the desired sweeping range of the mounting rod 122 when the animal decoy system 200 is activated.

Referring now to FIG. 5A through FIG. 5G is side views showing an example of the animal decoy system 200 shown in FIG. 3 in operation using the turkey decoy 205, in accordance with an embodiment of the disclosure. In this example, the intent of the operation of the animal decoy system 200 is to replicate or mimic the motion of a turkey feeding.

Figure 5A:
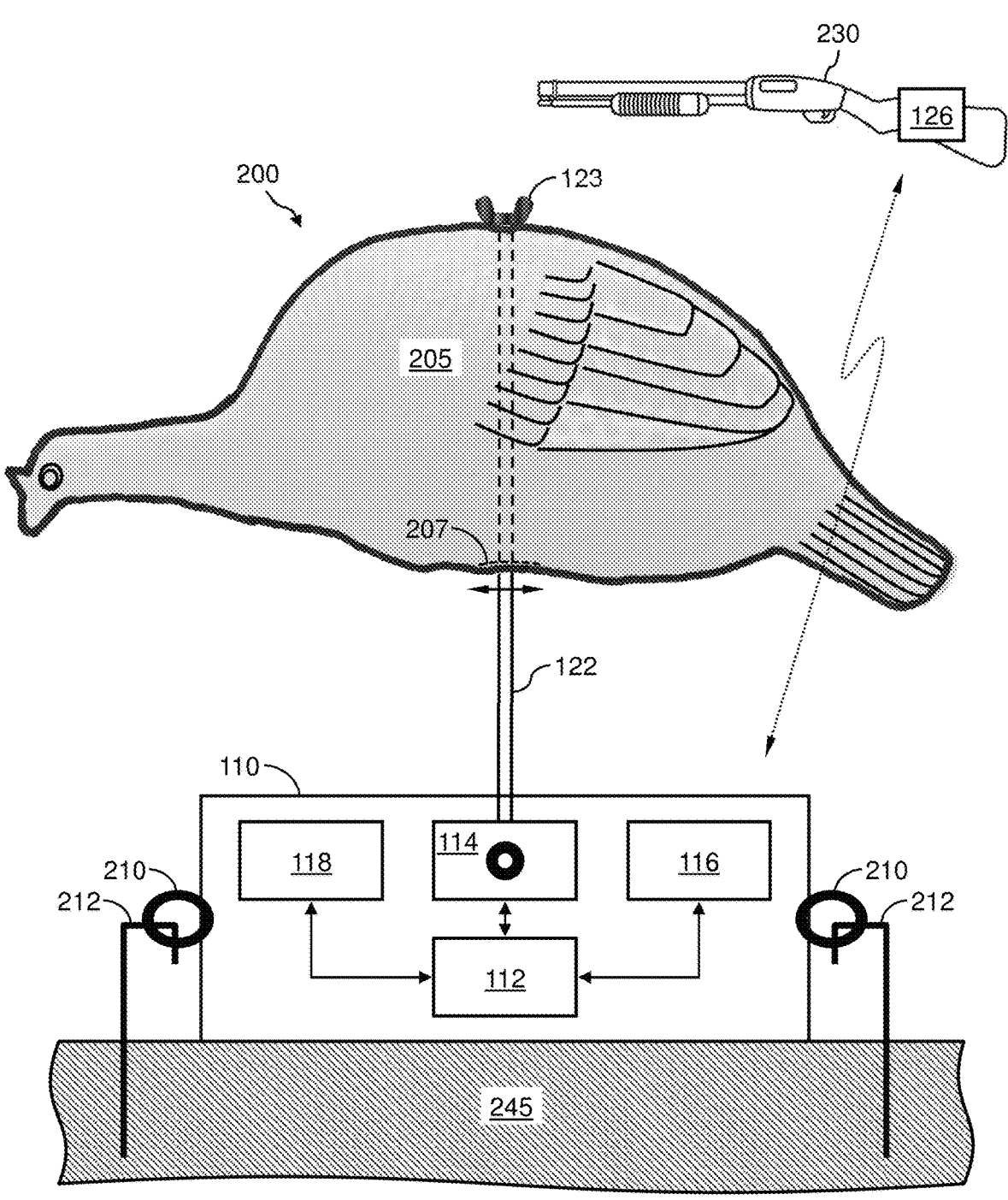

In the OFF state, the turkey decoy 205 may be held substantially vertical with respect to the ground, as shown, for example, in FIG. 5A. However, in the ON state, the turkey decoy 205 may be controlled to operate with certain sweeping motions from substantially vertical (see FIG. 5A) to some degree less than vertical (e.g., about 45 degrees or more) in the direction of the turkey head (see FIG. 5B through FIG. 5F). Below, the mounting rod 122 sweeping forward means the mounting rod 122 moving away from vertical in the direction of the head of the turkey decoy 205. Further, the mounting rod 122 sweeping backward means the mounting rod 122 moving back toward vertical in the direction away from the head of the turkey decoy 205.

First, FIG. 5A shows the animal decoy system 200 in the OFF state and with the turkey decoy 205 held substantially vertical with respect to the ground.

Figure 5B:
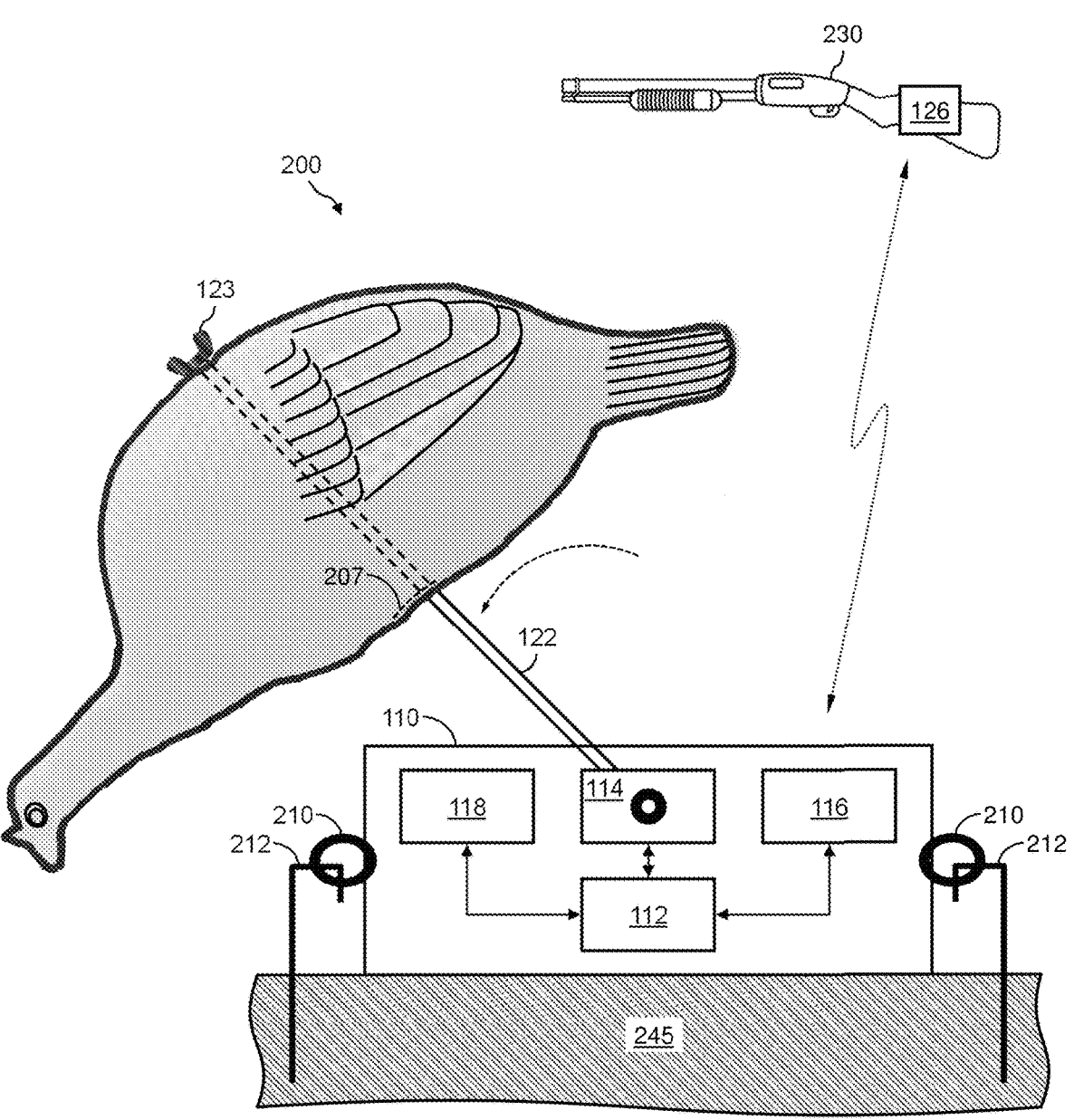

Next, FIG. 5B shows the animal decoy system 200 activated (i.e., in the ON state). The animal decoy system 200 may be activated using the remote control device 126. Here, the mounting rod 122 sweeps forward from vertical in the direction of the head of the turkey decoy 205. Further, the mounting rod 122 sweeps forward to its maximum range of motion. In doing so, the forward motion of the turkey decoy 205 along with gravity causes the turkey decoy 205 to rock forward to its maximum with the back of slot 207 stopping against the mounting rod 122.

Figure 5C:
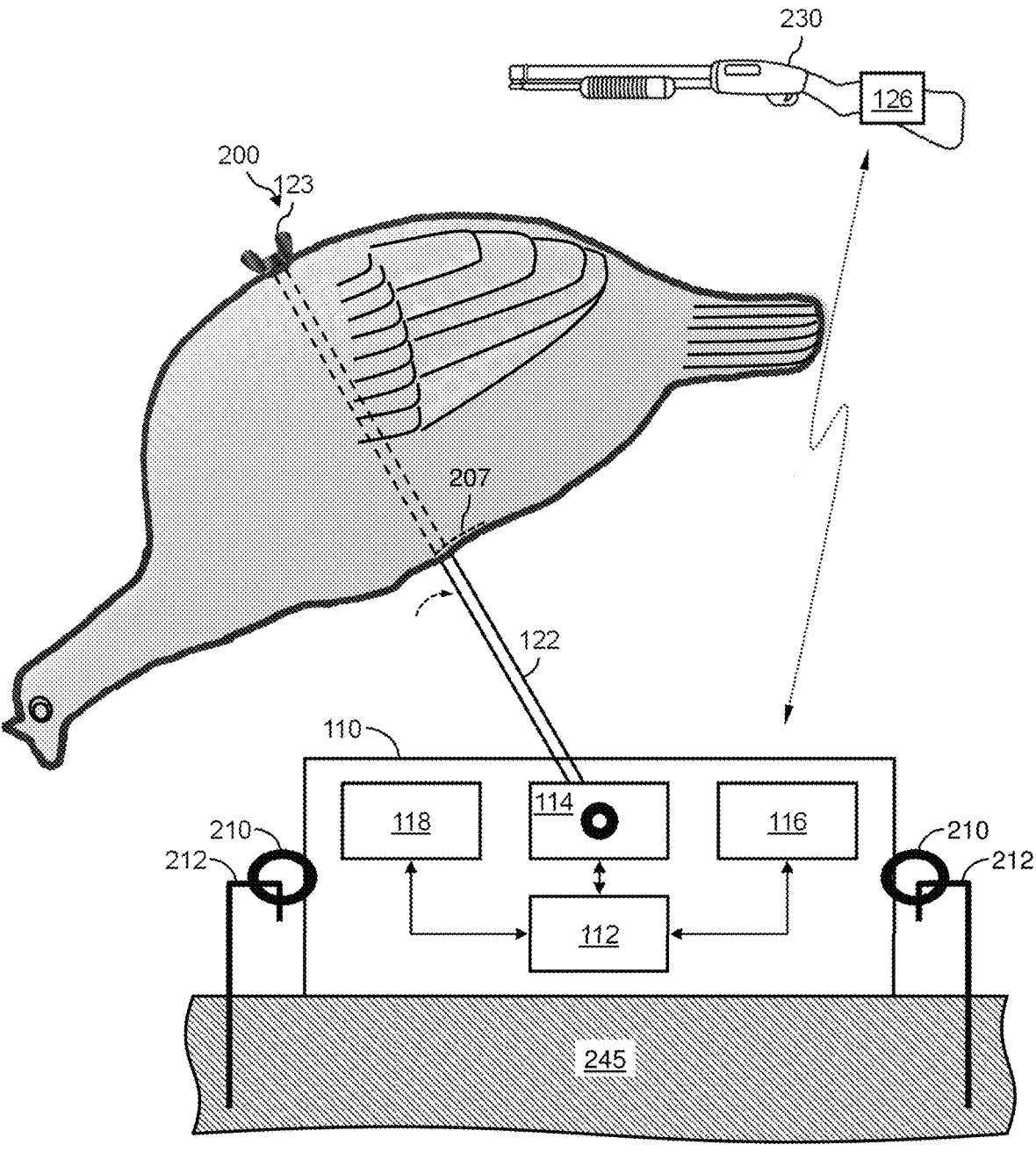

Next, FIG. 5C shows the animal decoy system 200 still activated with the mounting rod 122 sweeping backward a few degrees (not fully to vertical). In doing so, the backward motion of the turkey decoy 205 along with gravity causes the turkey decoy 205 to rock backward to its maximum now with the front of slot 207 stopping against the mounting rod 122. The action of the animal decoy system 200 shown in FIG. 5B and FIG. 5C mimic the action of a turkey's head bobbing up and down during feeding.

Figure 5D:
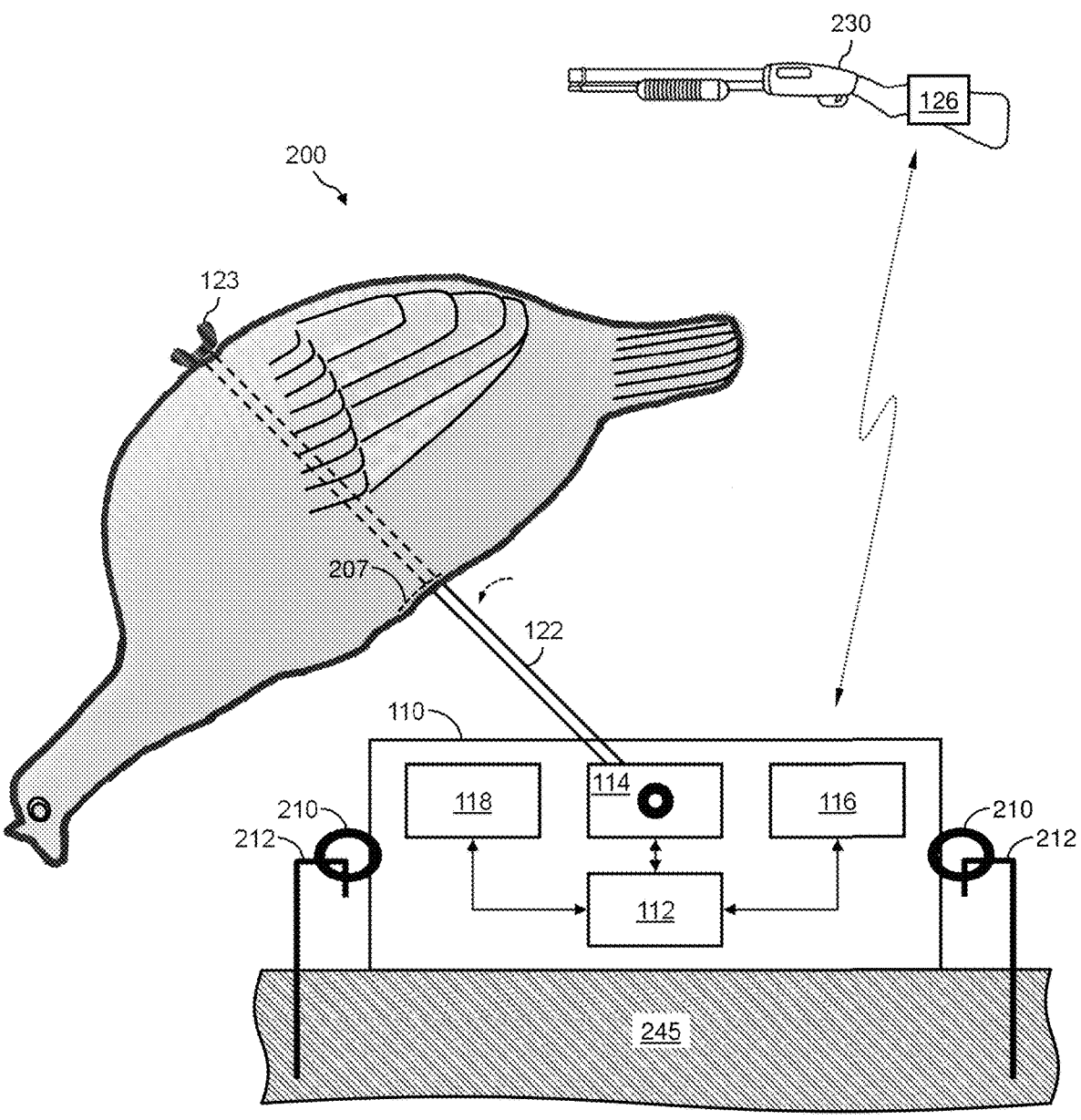

Next, FIG. 5D shows the animal decoy system 200 still activated. Here again, the mounting rod 122 sweeps forward to its maximum range of motion. In doing so, the forward motion of the turkey decoy 205 along with gravity causes the turkey decoy 205 to rock forward to its maximum with the back of slot 207 stopping against the mounting rod 122.

Figure 5E:
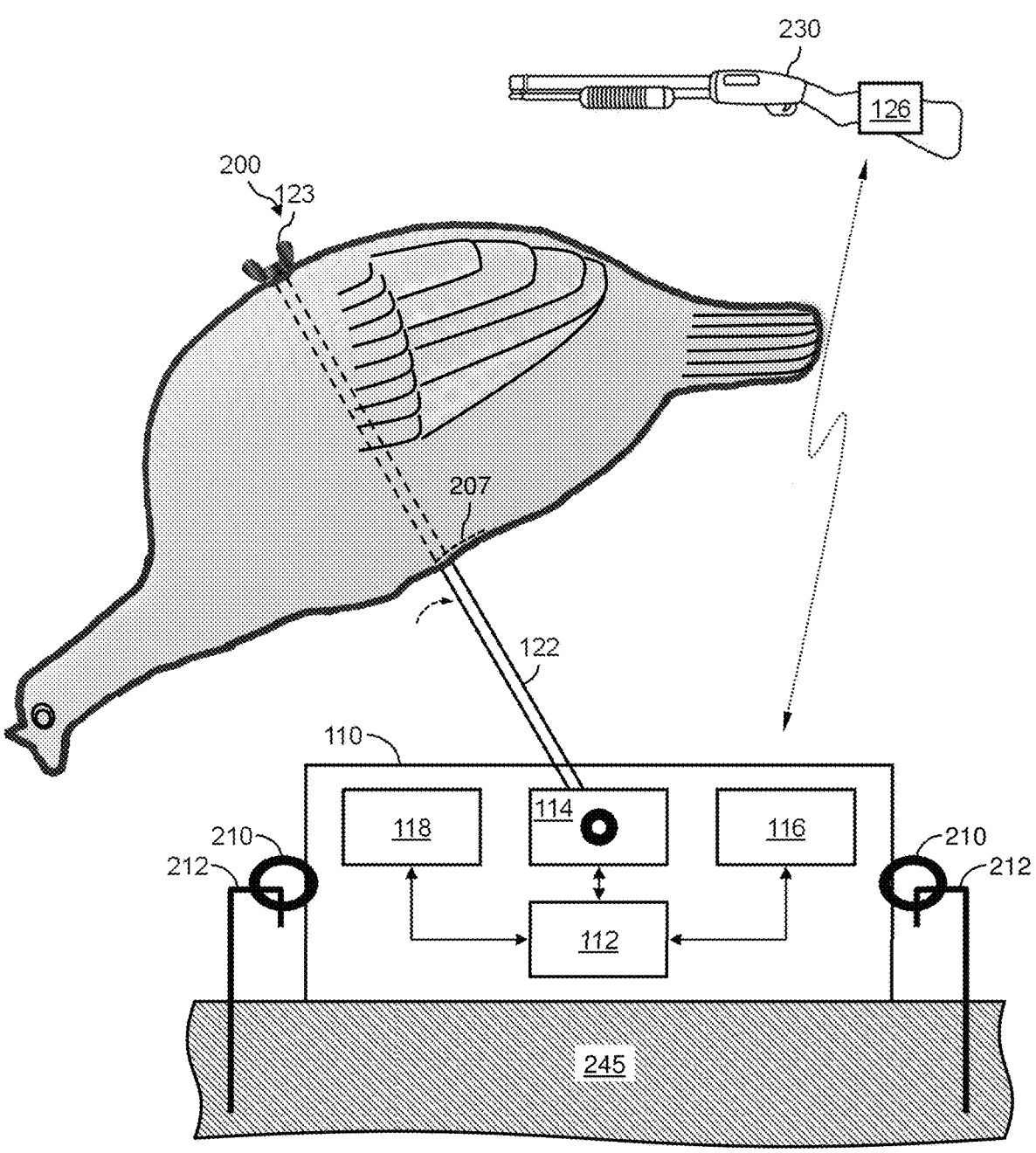

Next, FIG. 5E shows the animal decoy system 200 still activated. Here again, the mounting rod 122 sweeps backward a few degrees (not fully to vertical). In doing so, the backward motion of the turkey decoy 205 along with gravity causes the turkey decoy 205 to rock backward to its maximum now with the front of slot 207 stopping against the mounting rod 122. The action of the animal decoy system 200 shown in FIG. 5D and FIG. 5E mimic the action of a turkey's head bobbing up and down during feeding.

Figure 5F:
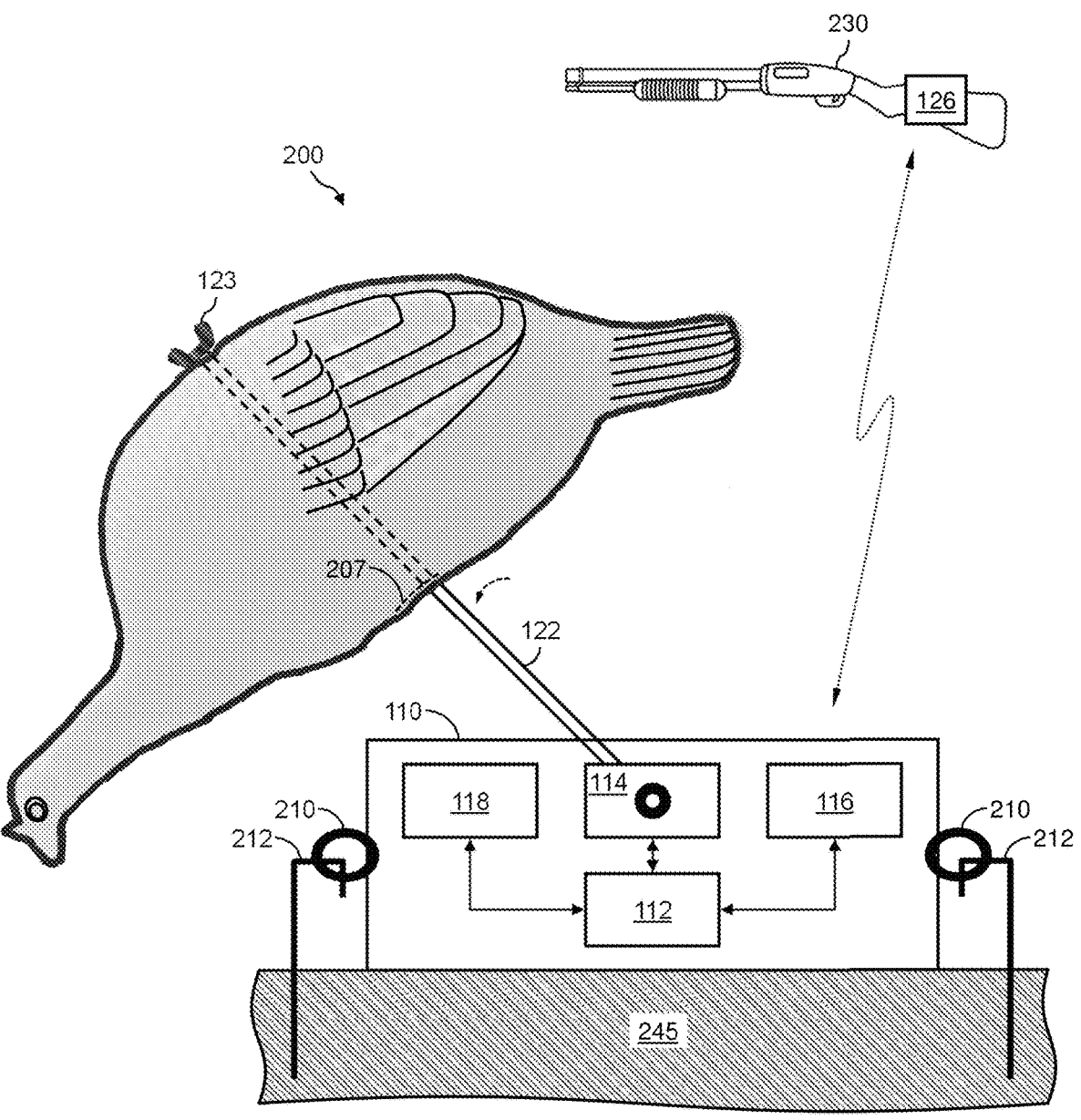

Next, FIG. 5F shows the animal decoy system 200 still activated. Here again, the mounting rod 122 sweeps forward to its maximum range of motion. In doing so, the forward motion of the turkey decoy 205 along with gravity causes the turkey decoy 205 to rock forward to its maximum with the back of slot 207 stopping against the mounting rod 122.

Figure 5G:
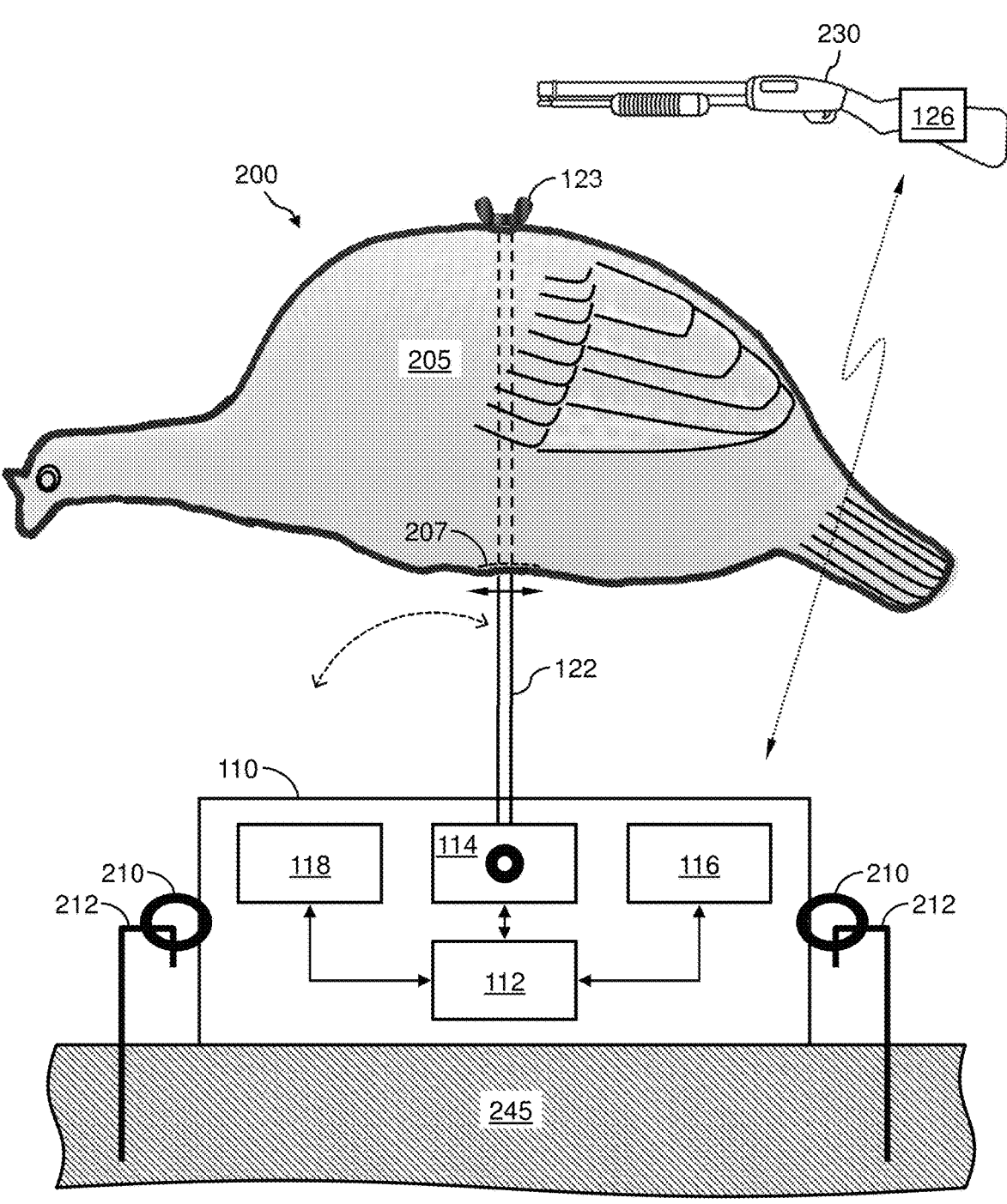

Next, FIG. 5G shows the animal decoy system 200 is returned to the OFF state and with the turkey decoy 205 returning to substantially vertical with respect to the ground. The animal decoy system 200 may be deactivated using the remote control device 126.

Referring now to FIG. 6 is a flow diagram of an example of a method 300 of using the animal decoy (or attracting) system 100, 200, in accordance with an embodiment of the disclosure. The method 300 may include, but is not limited to, the following steps.

At a step 310, an animal decoy system is provided that includes the movable animal decoy and the remote control device. In one example and referring to FIG. 1, the animal decoy system 100 that includes the animal decoy 120 and the remote control device 126 is provided. In another example and referring to FIG. 2 through FIG. 5G, the animal decoy system 200 that includes the turkey decoy 205 and the remote control device 126 is provided.

At a step 315, the animal decoy system including the movable animal decoy is positioned in a desired location. In one example and referring to FIG. 2 through FIG. 5G, the animal decoy system 200 that includes the turkey decoy 205 is positioned in a desired location. For example, when using the moveable turkey decoy 205, the animal decoy system 200 may be positioned at the edge of or in a field or in the woods in a place that is frequented by turkey.

At a step 320, the user positions himself/herself out of view from any target animals that may be in the vicinity, yet within view of and in close proximity to the animal decoy system. For example, the user of the animal decoy system 200 positions himself/herself out of view from any turkeys that may be in the vicinity, yet within view of and in close proximity to the moveable turkey decoy 205 of the animal decoy system 200. Further, the user is holding the remote control device 126.

At a step 325, upon detecting the presence of an animal of interest being in close proximity, or at some desired time interval, the animal decoy system is activated for actuating the animal decoy. For example, upon detecting the presence of a turkey being in close proximity, or at some desired time interval, the user of the animal decoy system 200 uses remote control device 126 to activate the moveable turkey decoy 205. Further, the animal decoy system 200 is activated for actuating the moveable turkey decoy 205, for example, as shown and described in FIG. 5A through FIG. 5G. In the example, the animal decoy system 200 may be considered a turkey decoy system for replicating or mimicking a turkey that is feeding.

Referring now to FIG. 7 is a block diagram of another example embodiment of animal decoy (or attracting) system 100 including a weighted enclosure rather than an anchored enclosure, in accordance with another embodiment of the disclosure. The animal decoy (or attracting) system 100 shown in FIG. 7 is substantially the same as the animal decoy (or attracting) system 100 shown in FIG. 1 except that that the anchor mechanisms 124 are omitted. Instead, the base enclosure 110 is a weighted enclosure to help secure the animal decoy system 100 on the ground. For example, a weighted plate 140 may be provided inside the base enclosure 110. In yet another example, the base enclosure 110 may include both the weighted plate 140 and the anchor mechanisms 124.

Referring now to FIG. 8 is a block diagram of an example of another example embodiment of animal decoy (or attracting) system 100 and showing another range of motion, in accordance with yet another embodiment of the disclosure. In this example, using the motor 114, the mounting rod 122 may be moved in both directions with respect to vertical. That is, in this example, the mounting rod 122 is not limited to moving in one direction only from vertical.

Referring now to FIG. 9 is a block diagram of an example of an animal decoy (or attracting) system 400 including a mobile app, in accordance with another embodiment of the disclosure. The animal decoy system 400 may be substantially the same as the animal decoy system 400 shown in FIG. 1 except for additional components for operation using a mobile app. For example, in addition to controller 112, motor 114, communications interface 116, and power source 118, a location tracking system 422 and some amount of data storage 424 may be provided within the base enclosure 110.

The location tracking system 422 and the data storage 424 may be controlled via the controller 112. For example, the location tracking system 422 may include a global positioning system (GPS) receiver, such as a global navigation satellite system (GNSS) receiver. The data storage 424 can be any volatile or non-volatile memory device. The data storage 424 can be built into or separate from controller 112. Further, the data storage 424 can be any combination of onboard and portable memory, such as a secure digital (SD) card or universal serial bus (USB) flash drive.

Further, the animal decoy system 400 may include mobile devices 410, which may be any mobile devices belonging to users 405 of the animal decoy system 400. In a hunting application, the users 405 may be game hunters. The mobile devices 410 may be, but are not limited to, mobile phones (i.e., smartphones), tablet devices, smartwatches, and the like. In one example, mobile devices 410 may be connected to a network, such as a network 420. Network 420 may be, for example, a local area network (LAN) or wide area network (WAN) for connecting to the internet, a cellular network, and the like.

Further, an animal decoy mobile app 412 may be installed and running on mobile devices 410. For example, the animal decoy mobile app 412 may be designed to operate on any device platform, including for example, Windows, Android, Apple, and the like.

In the animal decoy system 400, the animal decoy mobile app 412 may be used to activate the moveable animal decoy 120. Further, any other information may be managed using the animal decoy mobile app 412. For example, location data from the location tracking system 422, timestamp data, and system health data may be stored for each use of the animal decoy system 400. Further, using the animal decoy mobile app 412, the users 405 may log results information with respect to each use of the animal decoy system 400.

Referring now again to FIG. 1 through FIG. 9, the animal decoy systems 100, 200, 400 may further include a scent pad (not shown) configured for attachment to any types of the animal decoy 120. For example, in the animal decoy system 200, the scent pad may be attached to the turkey decoy 205. Here, when the motor 114 is actuated and moves the turkey decoy 205 the scent pad moves through the air to improve release of the scent. The scent pad may include various scents depending on the type of animal being targeted. The scent pad may be attached using a hook and pile fastener, adhesive, snaps, buttons, pins, or other suitable methods.

Each of the animal decoy systems 100, 200, 400 may further include a carry bag, such as a duffel bag, of a size and shape to accommodate the system for easy transport and storage. In hunting applications, the carry bag is preferably a blaze, or hunter's orange color for safety in transporting the animal decoy systems 100, 200, 400 in and out of the hunting area.

While the invention has been described in terms of various specific embodiments, those skilled in the art will recognize that the invention can be practiced with modification within the spirit and scope of the claims.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

The terms "comprise," "comprises," "comprising," "include," "includes," and "including," are intended to be non-limiting, such that recitation of items in a list is not to the exclusion of other like items that may be substituted or added to the listed items.

Terms like "preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present disclosure.

The term "substantially" is utilized herein to represent the inherent degree of uncertainty that may be attributed to any quantitative comparison, value, measurement, or other representation and to represent the degree by which a quantitative representation may vary from a stated reference without resulting in a change in the basic function of the subject matter at issue.

Various modifications and variations of the disclosed methods, compositions and uses of the disclosure will be apparent to the skilled person without departing from the scope and spirit of the disclosure. Although the subject matter has been disclosed in connection with specific preferred aspects or embodiments, it should be understood that the subject matter as claimed should not be unduly limited to such specific aspects or embodiments.

The subject matter may be implemented using hardware, software, or a combination thereof and may be implemented in one or more computer systems or other processing systems. In one aspect, the subject matter is directed toward one or more computer systems capable of carrying out the functionality described herein.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A remote activated moveable animal decoy system comprising:

a. an animal decoy;

b. a motor;

c. a mounting rod, wherein the mounting rod is configured to be coupled to the motor at a first end of the mounting rod and to the animal decoy at a second end of the mounting rod, and wherein the motor is configured to impart motion to the rod, and thereby the animal decoy, upon actuation of the motor;

d. a power source, wherein the power source is configured to provide power to the motor;

e. a base, wherein the base is configured for supporting the remote activated moveable animal decoy system upon a ground surface, and wherein one or more of the motor, the power source, a communications interface, and/or a controller is housed within the base; and f. a remote activation device, wherein the remote activation device is configured to actuate the motor remotely.

2. The system of claim 1, wherein the motor comprise a servo motor.

3. The system of claim 1, wherein the power source comprises a battery pack.

4. The system of claim 1, wherein the base comprises one or more anchor mechanisms for anchoring the system to a ground surface.

5. The system of claim 1, wherein the animal decoy comprises a turkey decoy.

6. The system of claim 1, wherein the animal decoy is removable from the connecting rod.

7. The system of claim 1, wherein the motor is configured to move the connecting rod between a first position and a second position, wherein in the first position the connecting rod is generally vertical and substantially perpendicular to a ground surface and in the second position the connecting rod is at an angle less than 90 degrees relative to the ground surface.

8. The system of claim 1, wherein the motor is configured to move the connecting rod from a first position to a second position and then back and forth between the second position and a third position, wherein in the first position the connecting rod is generally vertical and substantially perpendicular to a ground surface, in the second position the connecting rod is at an angle less than 90 degrees relative to the ground surface, and in the third position the connecting rod is at an angle relative to the ground surface between that of the first position of the connecting rod and that of the second position of the connecting rod.

9. The system of claim 8, wherein the animal decoy comprises a slit formed in its underside, wherein the connecting rod passes therethrough when installed thereon, and wherein the slit is configured to allow the animal decoy to rock forward and backward the width of the slit, as well as up and down, as the connecting rod is moved back and forth between the second position and third position.

10. The system of claim 9, wherein the up and down and backward and forward movement of the animal decoy mimics an animal's head bobbing up and down during feeding.

11. A method of using an animal attracting system, comprising:

a. providing an animal attracting system, comprising:

i. an animal decoy;

ii. a motor;

iii. a mounting rod, wherein the mounting rod is configured to be coupled to the motor at a first end of the mounting rod and to the animal decoy at a second end of the mounting rod, and wherein the motor is configured to impart motion to the rod, and thereby the animal decoy, upon actuation of the motor;

iv. a power source, wherein the power source is configured to provide power to the motor;

v. a base, wherein the base is configured for supporting the remote activated moveable animal decoy system upon a ground surface, and wherein one or more of the motor, the power source, a communications interface, and/or a controller is housed within the base; and vi. a remote activation device, wherein the remote activation device is configured to actuate the motor remotely;

b. positioning the animal attracting system in a desired location; and c. actuating the animal attracting system via the remote activation device.

12. The method of claim 11, wherein the motor comprise a servo motor.

13. The method of claim 11, wherein the power source comprises a battery pack.

14. The method of claim 11, wherein the base comprises one or more anchor mechanisms for anchoring the system to a ground surface.

15. The method of claim 11, wherein the animal decoy comprises a turkey decoy.

16. The method of claim 11, wherein the animal decoy is removable from the connecting rod.

17. The method of claim 11, wherein the motor is configured to move the connecting rod between a first position and a second position, wherein in the first position the connecting rod is generally vertical and substantially perpendicular to a ground surface and in the second position the connecting rod is at an angle less than 90 degrees relative to the ground surface.

18. The method of claim 11, wherein the motor is configured to move the connecting rod from a first position to a second position and then back and forth between the second position and a third position, wherein in the first position the connecting rod is generally vertical and substantially perpendicular to a ground surface, in the second position the connecting rod is at an angle less than 90 degrees relative to the ground surface, and in the third position the connecting rod is at an angle relative to the ground surface between that of the first position of the connecting rod and that of the second position of the connecting rod.

19. The method of claim 18, wherein the animal decoy comprises a slit formed in its underside, wherein the connecting rod passes therethrough when installed thereon, and wherein the slit is configured to allow the animal decoy to rock forward and backward the width of the slit, as well as up and down, as the connecting rod is moved back and forth between the second position and third position.

20. The method of claim 19, wherein the up and down and backward and forward movement of the animal decoy mimics an animal's head bobbing up and down during feeding.

* * * * *